US007522931B2

(12) United States Patent
Ranalli et al.

(10) Patent No.: US 7,522,931 B2
(45) Date of Patent: Apr. 21, 2009

(54) METHOD AND APPARATUS FOR ACCESSING A NETWORK COMPUTER TO ESTABLISH A PUSH-TO-TALK SESSION

(75) Inventors: Douglas J. Ranalli, Andover, MA (US); David P. Peek, Atkinson, NH (US); Robert H. Walter, Westford, MA (US)

(73) Assignee: Netnumber, Inc., Lowell, MA (US)

( * ) Notice: Subject to any disclaimer, the term of this patent is extended or adjusted under 35 U.S.C. 154(b) by 251 days.

(21) Appl. No.: 10/802,935

(22) Filed: Mar. 18, 2004

(65) Prior Publication Data

US 2004/0192364 A1   Sep. 30, 2004

Related U.S. Application Data

(63) Continuation-in-part of application No. 10/302,882, filed on Nov. 25, 2002, now Pat. No. 6,748,057, which is a continuation of application No. 09/456,646, filed on Dec. 8, 1999, now Pat. No. 6,539,077, which is a continuation-in-part of application No. 09/226,901, filed on Jan. 8, 1999, now abandoned, and a continuation-in-part of application No. 09/092,764, filed on Jun. 5, 1998, now Pat. No. 6,292,799.

(51) Int. Cl.
*H04W 4/00* (2009.01)
*H04B 7/00* (2006.01)
*H04L 12/16* (2006.01)
*H04Q 11/00* (2006.01)

(52) U.S. Cl. .................... 455/518; 455/519; 455/435.1; 370/262

(58) Field of Classification Search ................. 455/518, 455/519, 414.1, 418, 435.1, 438; 370/262
See application file for complete search history.

(56) References Cited

U.S. PATENT DOCUMENTS 4,318,182 A    3/1982   Bachman et al. ............ 364/200

(Continued)

FOREIGN PATENT DOCUMENTS

EP    0540081    5/1993

(Continued)

OTHER PUBLICATIONS

Electronic Messaging Association, "Welcome to the Electronic Messaging Association,' What's New?" (Home Page) wvsiwyg://70/ http://www.ema.org/ printed Oct. 8, 1998.

(Continued)

*Primary Examiner*—Nay A Maung
*Assistant Examiner*—Andrew Wendell
(74) *Attorney, Agent, or Firm*—Rissman Hendricks & Oliverio LLP

(57) ABSTRACT

A wireless phone user registered for push-to-talk (PTT) services desires a push-to-talk session with a party on a network computer accessible via a public data network (like the Internet) that is not registered with any PTT service. The registered user enters a unique identifier, as a destination address for such computer, and a PTT server uses the unique identifier to query a Directory Service available on the public data network to obtain a PTT address for the destination computer. The PTT server then forwards or proxies the PTT request to the destination computer. As a result, the number of push-to-talk destinations available to the wireless phone user is expanded to include any number of push-to-talk enabled computers available on the Internet that are known to the Directory Service.

21 Claims, 4 Drawing Sheets

U.S. PATENT DOCUMENTS

| | | | |
|---|---|---|---|
| 4,451,881 A | 5/1984 | Grice et al. | 364/200 |
| 4,850,007 A | 7/1989 | Marino et al. | 379/67 |
| 4,924,496 A | 5/1990 | Figa et al. | 379/142 |
| 4,942,598 A | 7/1990 | Davis | 379/57 |
| 5,046,088 A | 9/1991 | Margulies | 379/211 |
| 5,095,529 A | 3/1992 | Comroe et al. | 455/16 |
| 5,315,705 A | 5/1994 | Iwami et al. | 395/200 |
| 5,369,781 A | 11/1994 | Comroe et al. | 455/15 |
| 5,387,905 A | 2/1995 | Grube et al. | 340/825.52 |
| 5,483,586 A | 1/1996 | Sussman | 379/201 |
| 5,572,576 A | 11/1996 | Klausner et al. | 379/67 |
| 5,583,919 A | 12/1996 | Talvard et al. | 379/67 |
| 5,594,784 A | 1/1997 | Velius | 379/88 |
| 5,608,784 A | 3/1997 | Miller | 379/88 |
| 5,608,786 A | 3/1997 | Gordon | 379/100 |
| 5,646,839 A | 7/1997 | Katz | 379/93.01 |
| 5,661,784 A | 8/1997 | Zinke | 379/89 |
| 5,684,862 A | 11/1997 | Finnigan | 379/88 |
| 5,684,863 A | 11/1997 | Katz | 379/88 |
| 5,687,220 A | 11/1997 | Finnigan | 379/67 |
| 5,692,038 A | 11/1997 | Kraus et al. | 379/210 |
| 5,761,201 A | 6/1998 | Vaudreuil | 370/392 |
| 5,799,061 A | 8/1998 | Melcher et al. | 379/45 |
| 5,809,128 A | 9/1998 | McMullin et al. | 379/215 |
| 5,825,854 A | 10/1998 | Larson et al. | 379/67 |
| 5,850,433 A | 12/1998 | Rondeau | 379/201 |
| 5,889,844 A * | 3/1999 | Kim et al. | 379/202.01 |
| 5,896,444 A | 4/1999 | Perlman et al. | 379/93.35 |
| 5,912,882 A | 6/1999 | Yafuso et al. | 370/270 |
| 5,940,476 A | 8/1999 | Morganstein et al. | 379/88.02 |
| 5,943,395 A | 8/1999 | Hansen | 379/52 |
| 5,963,618 A | 10/1999 | Porter | 379/88.17 |
| 5,987,102 A | 11/1999 | Elliott et al. | 379/93.17 |
| 6,005,922 A | 12/1999 | Longster et al. | 379/88.18 |
| 6,011,834 A | 1/2000 | Jeong | 379/88.26 |
| 6,038,305 A | 3/2000 | McAllister et al. | 379/207 |
| 6,061,432 A | 5/2000 | Wallace et al. | 379/88.18 |
| 6,064,666 A | 5/2000 | Willner et al. | 370/352 |
| 6,065,016 A | 5/2000 | Stuntebeck et al. | 707/200 |
| 6,069,890 A | 5/2000 | White et al. | 370/352 |
| 6,088,717 A | 7/2000 | Reed et al. | 709/201 |
| 6,094,475 A | 7/2000 | Kang | 379/84 |
| 6,097,733 A | 8/2000 | Basu et al. | 370/468 |
| 6,097,942 A * | 8/2000 | Laiho | 455/414.1 |
| 6,104,711 A | 8/2000 | Voit | 370/352 |
| 6,108,704 A | 8/2000 | Hutton et al. | 709/227 |
| 6,122,357 A | 9/2000 | Farris et al. | 379/207 |
| 6,125,113 A | 9/2000 | Farris et al. | 370/389 |
| 6,138,009 A | 10/2000 | Birgerson | 455/419 |
| 6,215,858 B1 | 4/2001 | Bartholomew et al. | 379/88.17 |
| 6,222,520 B1 | 4/2001 | Gerszberg et al. | 345/342 |
| 6,282,574 B1 | 8/2001 | Voit | 709/230 |
| 6,292,799 B1 | 9/2001 | Peek et al. | 707/10 |
| 6,295,284 B1 | 9/2001 | Maggenti | 370/328 |
| 6,324,264 B1 | 11/2001 | Weiner et al. | 379/88.22 |
| 6,360,093 B1 | 3/2002 | Ross et al. | 455/414 |
| 6,411,816 B1 * | 6/2002 | McDonald et al. | 455/518 |
| 6,417,933 B1 * | 7/2002 | Szurkowski | 358/442 |
| 6,449,344 B1 | 9/2002 | Goldfiner et al. | 379/88.17 |
| 6,539,077 B1 | 3/2003 | Ranalli et al. | |
| 6,748,057 B2 | 6/2004 | Ranalli et al. | 379/88.17 |
| 7,280,502 B2 * | 10/2007 | Allen et al. | 370/329 |
| 7,460,838 B2 * | 12/2008 | Hasegawa | 455/90.2 |
| 2003/0012149 A1 * | 1/2003 | Maggenti et al. | 370/260 |
| 2003/0153339 A1 * | 8/2003 | Crockett et al. | 455/518 |
| 2003/0154249 A1 * | 8/2003 | Crockett et al. | 709/204 |
| 2003/0186716 A1 * | 10/2003 | Dorenbosch et al. | 455/519 |
| 2004/0203770 A1 * | 10/2004 | Chen et al. | 455/435.1 |
| 2005/0041625 A1 * | 2/2005 | Brewer | 370/335 |
| 2005/0136955 A1 * | 6/2005 | Mumick et al. | 455/466 |
| 2005/0221842 A1 * | 10/2005 | Kaneko et al. | 455/456.6 |
| 2006/0205427 A1 * | 9/2006 | Laible et al. | 455/518 |
| 2007/0127374 A1 * | 6/2007 | Black | 370/229 |
| 2007/0202909 A1 * | 8/2007 | Liu | 455/518 |
| 2008/0101340 A1 * | 5/2008 | Bernath | 370/352 |

FOREIGN PATENT DOCUMENTS

| | | |
|---|---|---|
| EP | 0823809 A2 | 11/1998 |
| EP | 0778680 | 9/1999 |
| JP | 2134052 | 5/1990 |
| JP | 3174838 | 7/1991 |
| WO | WO 9417642 | 8/1994 |
| WO | WO 9909768 | 2/1999 |

OTHER PUBLICATIONS

Eriksson, "Internet Directory Services with Click-To-Dial," Ericsson Review, SE, Ericsson. Stockholm, No. 3, Jan. 1, 1998, pp. 118-125, XP000783250.

Hui et al., "A Dynamic IP Addressing System for Internet Telephony Applications," Computer Communications, NL, Elsevier Science Publishers BV, Amsterdam, vol. 21, No. 3, Mar. 25, 1998, pp. 254-266, XP004115293.

VPIM White Paper, "Unified Messaging: The VPIM Initiative," Bernard M. Elliot, consultant, Vanguard Communication Corporation; http:///www.ema.org/vpimdir/present/vpimwp.html; Adapted for republication with permission of publisher, Business Communications Review, from vol. 27, No. 5, (May 1997), pp. 43-47; printed Oct. 8, 1998.

VPIM Frequently Asked Questions, "The Voice Profile for Internet Mail (VPIM) Work Group," last updated Oct. 7, 1998; http://www.ema.org/vpimdir/present/fag.html; printed Oct. 8, 1998.

"The Voice Profile for Internet Mail (VPIM) Work Group;" last updated Oct. 7, 1998, http://www.ema.org/vpimdir/present/mission.htm; printed Oct. 8, 1998.

P. Cockram & R.H. Tridgell: "A Standard Signaling Protocol for Band III Trunked Systems," Journal of the Institution of Electrical and Radio Engineers, vol. 57, No. 3, May 1987 pp. 113-118.

"Push to talk over Cellular (PoC)-Architecture," Draft Version 1.0—Jan. 9, 2004, Open Mobile Alliance, Ltd., OMA-AD_PoC-V1_0-20040109-D, 2003.

"Radical Pill Makes Banyan Healthy Again," The Boston Globe, Nov. 22, 1999.

Yu et al., "A Multimedia Gateway for Phone/Fax and MIME Mail," Computer Communications, NL, Elservier Science Publishers BV, Amsterdam, vol. 20, No. 8, Aug. 25, 1997, pp. 615-627, XP004126715.

* cited by examiner $ORIGIN ds.com.

123456789 IN NAPTR 100 10 "u" "N2U+ptt:sip" "!^.*$!sip:123456789.ds.com:5065!"

123456789 IN A 208.254.45.97

$ORIGIN ds.com.

_ptt_sip.123456789 IN SRV 100 10 5065 123456789.ds.com

123456789 IN A 208.254.45.97

METHOD AND APPARATUS FOR ACCESSING A NETWORK COMPUTER TO ESTABLISH A PUSH-TO-TALK SESSION

RELATED APPLICATIONS

This application is a continuation-in-part of U.S. Ser. No. 10/302,882 filed Nov. 25, 2002 now U.S. Pat. No. 6,748,057, entitled "Method And Apparatus For Correlating A Unique Identifier, Such As A PSTN Telephone Number, To An Internet Address To Enable Communications Over The Internet," which is a continuation of U.S. Ser. No. 09/456,646, filed Dec. 8, 1999, now U.S. Pat. No. 6,539,077, which is a continuation-in-part of U.S. Ser. No. 09/226,901 filed Jan. 8, 1999, now abandoned, and a continuation-in-part of U.S. Ser. No. 09/092,764 filed Jun. 5, 1998, now U.S. Pat. No. 6,292,799, to which priority is claimed and which are hereby incorporated by reference in their entirety.

FIELD OF THE INVENTION

This invention relates to communications services, and in particular to the extension of a wireless push-to-talk (PTT) service to include communication with any number of network computers, not registered for PTT service, but accessible by a public data network like the Internet.

BACKGROUND

Push-to-talk (PTT) service over cellular or wireless networks provides a type of half-duplex or one-way communications service between two or more users. See e.g., the Push-to-talk over Cellular (PoC) architecture, of the Open Mobile Alliance Ltd. Users often form a group, a predefined set of users, who then communicate with each other in a "point-to-multipoint" fashion. The communications are one-way: while one person (user) speaks, the other(s) listen(s). Turns to speak are generally granted on a first come, first serve basis by a user pressing a push-to-talk key or button on his/her wireless phone (or other user equipment). However, the PTT service provider may apply some type of arbitration process in order to insure "fair" access among the members of a PTT session.

Push-to-talk functionality is typically delivered across a mobile operator's private Internet Protocol (IP) data network using standard VoIP (Voice over IP) protocols, although other technology implementations are possible. In a typical IP network scenario, a mobile phone user with a push-to-talk enabled phone enters a PTT address for another mobile user who is registered for push-to-talk services and then presses the push-to-talk key on his/her mobile phone to initiate a session. In a typical scenario, the address of the destination mobile user can be based either on a mobile phone number (e.g., 1-978-555-1212) or on an Internet address in the form of a network access identifier (e.g., user@operator.com). If the destination user is available, the originator receives an immediate indication that the destination user is available and the originator can begin speaking. The call originator's voice is sent through the wireless operator's private IP network to the target handset. The call connection over the operator's IP network is almost instantaneous. Initiating a push-to-talk session to a mobile/wireless user who is not available simply results in a negative response tone.

FIG. 1 illustrates an example of a wireless operator's push-to-talk service (PTT service) as described in U.S. Pat. No. 6,360,093 to Ross. A wireless phone (102) with a push-to-talk button (104) registers with a push-to-talk server (PTT server) (110) located on the wireless operator's IP network (108), using standard VoIP protocols. A base station (106) provides the interface between the radio signals used to communicate with the wireless phone and the service provider's IP network. The PTT server (110) maintains a database of registered wireless phones (102, 103, 105) and associated Internet addresses. The PTT server acts as the clearance or acceptance point for all push-to-talk sessions with its registered wireless users. All push-to-talk session requests are first presented to the PTT server which then forwards or proxies the request (via base stations 106, 107) to the appropriate registered destination wireless phone(s). A network computer (112) with PTT functionality (109) may also be configured to emulate a combined base station and wireless phone and register for push-to-talk services with the wireless operator's PTT server.

A PTT server can establish a push-to-talk session between two or more of its locally registered wireless phones or network computers. The PTT server(s) of one PTT service provider can also be configured to communicate with a known set of PTT servers of one or more other PTT service providers to enable push-to-talk sessions between two or more wireless phones or computers, each of which is registered with a different PTT service provider. What it cannot do, however, is establish a push-to-talk session with a push-to-talk enabled computer that is not registered with any operator's PTT service.

SUMMARY OF THE INVENTION

Systems and methods consistent with implementations of the present invention are provided in which a PTT service can access a Directory Service (DS), via a public data network such as the Internet. The DS contains push-to-talk addresses and associated unique identifiers for any number of network computers, accessible via the Internet, that can support push-to-talk functionality but are not registered with any PTT service. A network computer with push-to-talk functionality has its push-to-talk address recorded with the Directory Service and is assigned a unique identifier by the Directory Service.

According to one method, a wireless phone user registered for push-to-talk services with a wireless operator's PTT server initiates a push-to-talk session with an unregistered network computer by entering the network computer's unique identifier as a destination address for a push-to-talk session. The PTT server uses the unique identifier provided by the originating wireless phone user, to query the Directory Service to obtain a push-to-talk address for the destination computer and then forwards or proxies the push-to-talk request to the destination computer. As a result, the number of push-to-talk destinations available to the wireless phone user is expanded to include any number of push-to-talk enabled network computers that are known to the Directory Service. In the event that the user of the destination computer is not available to accept a push-to-talk session, the push-to-talk software running on the destination computer can be optionally configured to return a signal indicating that the caller can begin speaking a message that the computer will record in the form of a push-to-talk message, similar to a voice message, that the called party can review at a later time.

More generally, according to one implementation, a wireless phone, having PTT functionality and registered with a PTT server, sends a request for a PTT session to the PTT server. The request includes a unique identifier of a destination network computer, accessible on a public data network, having PTT functionality and not registered with a PTT server. The PTT server receives the request and sends a query for a PTT address for the destination network computer to a Directory Service accessible on the public data network. The Directory Service receives the query and returns the PTT address to the PTT server. The PTT server receives the PTT address and sends a request for a PTT session to the destination network computer.

In various method embodiments, the public data network is the Internet. The PTT address may be a Session Initiation Protocol (SIP) address, which for example may be a SIP uniform resource identifier (SIP-URI) that can be resolved into an IP address and a port number for receiving PTT sessions at the network computer. As used herein, the network computer may be any of various devices accessible via a public data network, via a fixed line and/or wireless connection, which include a processor and memory and PTT functionality. For example, the network computer may be a personal computer or a hand-held device such as a Personal Digital Assistant.

In various embodiments, the unique identifier which enables PTT access to the network computer can be in the form of a fixed or variable length name or number. In select embodiments, the name or number is prefixed with a * or a # character. In a particular embodiment, the unique identifier is a telephone number in the form of an ITU-T recommended E.164 format, with a # prefix.

In an apparatus embodiment, a PTT server contains means for querying a Directory Service, accessible on a public data network, with a unique identifier to obtain a PTT address for initiating a PTT session with a destination network computer not registered with a PTT server. The means for querying may be any combination of hardware and/or software. The means for querying include means for sending a request for and in response receiving the PTT address from the Directory Service. The server also includes means for sending a PTT session request to the destination network computer and means for receiving a PTT response from the network computer. The server also includes means for accessing a user equipment registered with the PTT server, such as a wireless phone or network computer. The server includes means for receiving a request for a PTT session from the registered user equipment with the unique identifier, and means for sending the user equipment a session response.

In another embodiment, an apparatus is provided which includes a Directory Service, residing on a computer and accessible on a public data network, which contains at least one unique identifier and an associated PTT address of a network computer having PTT functionality (and which computer is) accessible on the public data network. The Directory Service may store the PTT address and associated unique identifier as one or more domain name system (DNS) resource records. The resource records may be in the format of Naming Authority Pointer (NAPTR), Service (SRV) and A (IP-address) records.

A method is also provided of establishing a push-to-talk session between an inviting user (originator) and an invited user (destination), the improvement comprising that when the invited user is not available to accept a push-to-talk session, the user equipment of the invited user signals the inviting user to record a push-to-talk message.

These and other embodiments are described in greater detail in the accompanying figures and following detailed description.

DETAILED DESCRIPTION

Figure 1:
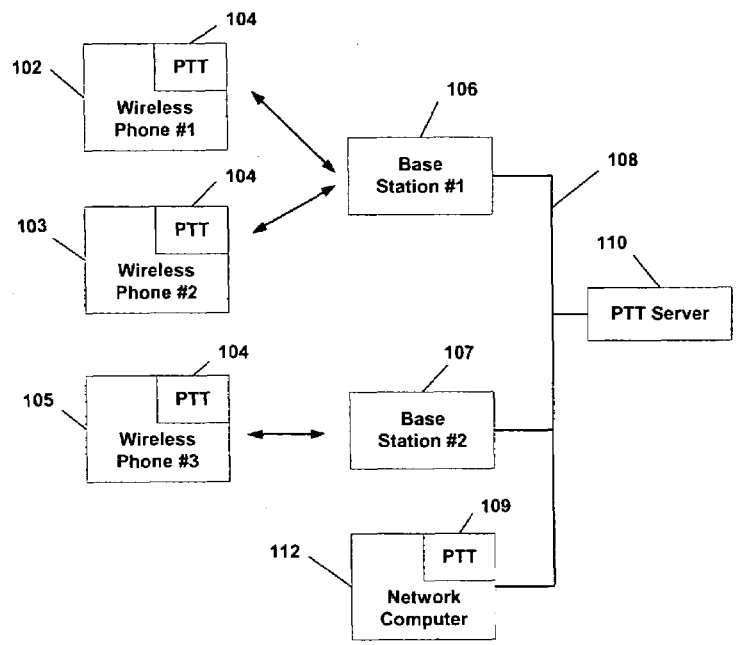
FIG. 1 is a block diagram of a typical wireless operator's push-to-talk network system as described in U.S. Pat. No. 6,360,093 to Ross.
Figure 2:
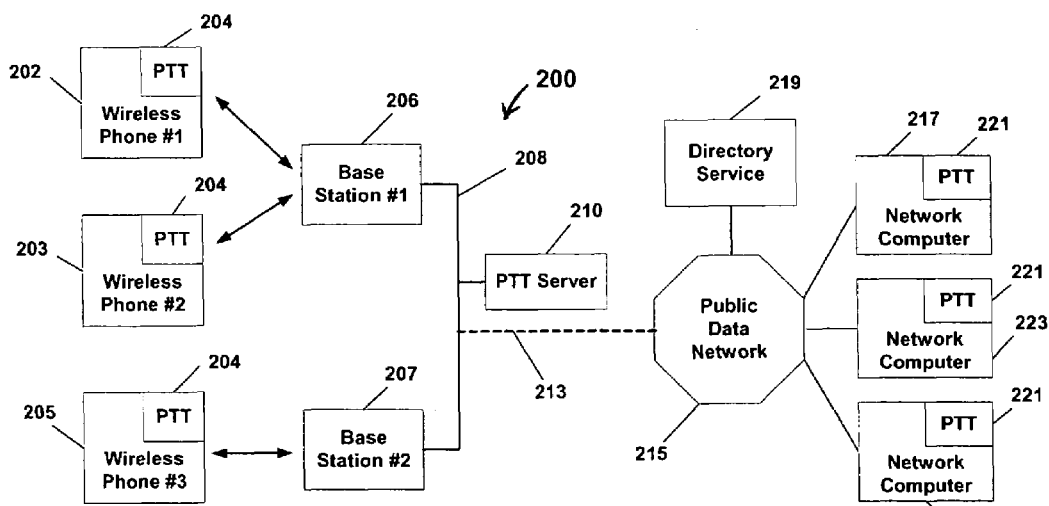
FIG. 2 is a diagram of a PTT network system according to one illustrative embodiment consistent with principles of the present invention.

FIG. 2 is a block diagram of an illustrative embodiment of a system consistent with principles of the present invention. The system (200) includes an IP data network (208) of a wireless push-to-talk service provider, as described in FIG. 1, with one or more wireless phones (202, 203, 205) having push-to-talk functionality (e.g., button) (204) which communicate with one or more base stations (206, 207) and a push-to-talk server (PTT server) (210). The system also includes a network connection (213) between the PTT service provider's network (208) and a public data network (215). The network (215) provides a connection to one or more unregistered network computers (217, 223, 224) with push-to-talk functionality (221), as well as a connection to a Directory Service (219). The Directory Service (DS) maintains a database of unique identifiers and associated push-to-talk addresses for the one or more unregistered computers (217, 223, 224). For simplicity, a direct network connection (213) is shown between the wireless operator's data network (208) and the public data network (215). In practice, several routers, firewalls and/or possibly other security devices would be included in the connection between the two networks.

The network computers (217, 223, 224) have not registered with any PTT service provider, and are thus not otherwise accessible for inclusion in a PTT session, except as described herein by way of the Directory Service (219). By providing a PTT address to the DS (219), and being assigned an associated unique identifier, each network computer (217, 223, 224) becomes reachable to users registered with various PTT service providers in the manner described below.

In the foregoing illustrative embodiment, the network computer (217) is a personal computer connected to the Internet though either its own dedicated connection or through a shared connection accessible on a local (fixed line or wireless) network. In another embodiment, the network computer takes the form of a wireless data device, such as a personal digital assistant (PDA), connected to the Internet via a wireless data network connection. As shown in FIG. 2, a wireless phone (202) with push-to-talk functionality (204) is in wireless communication with base station (206), where station (206) is connected to the wireless operator's data network (208). The wireless phone has registered for push-to-talk service with the wireless operator's PTT server (210), for example using standard Voice over IP (VoIP) protocols. The unregistered computer (217) with push-to-talk functionality (221), connected to the public data network (215), has provided a push-to-talk service address to the Directory Service (219) using, for example, standard VoIP protocols or standard directory or database update protocols. The Directory Service maintains a database of unique identifiers and associated push-to-talk service addresses for the one or more computers (217, 223, 224). The push-to-talk service address associated with a computer can take the form of any number of standard Internet addressing formats as described below.

Figure 3:
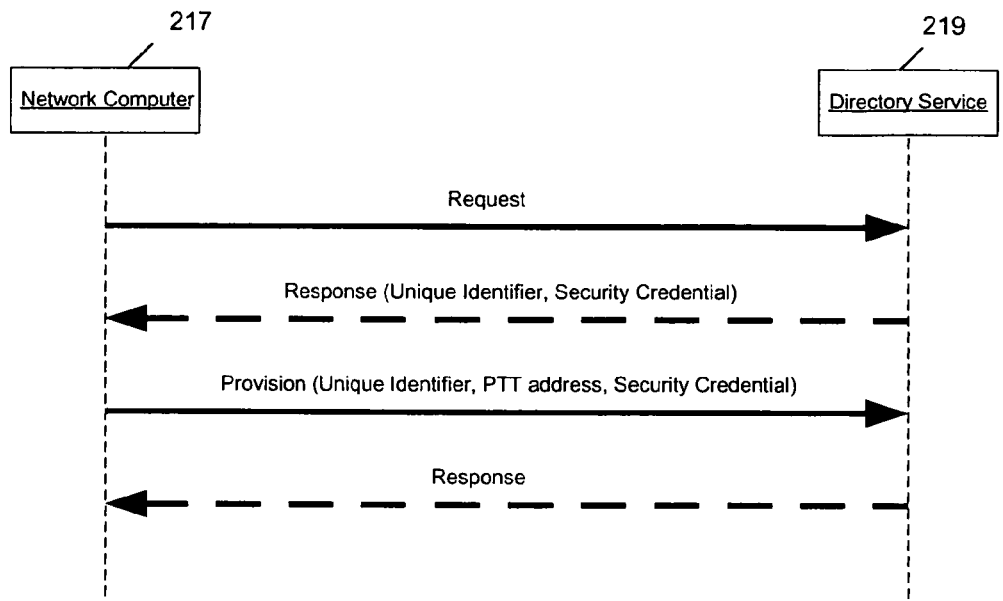
FIG. 3 is a sequence diagram of a process or method for providing a push-to-talk address of a network computer to a Directory Service.

FIG. 3 is a sequence diagram of a process or method for providing a push-to-talk address for a network computer (217) to the Directory Service (219). The process starts with the end-user of a network computer (217) sending a request for a unique identifier to the Directory Service (219). In one embodiment, this request can be made using a standard web interface protocol like HTTP. Upon receiving the request from the computer (217), the Directory Service (219) sends a response which includes a unique identifier along with a security credential or password. The computer (217) then sends a provision message to the DS (219) which includes the computer's unique identifier along with a push-to-talk address and the security credential or password. In one embodiment the computer (217) sends the provision message directly to the DS (219); in another embodiment, the computer (217) sends the provision message to the DS (219) via one or more intermediary servers. The DS sends a response acknowledging receipt of the PTT address. The PTT address is then maintained along with the associated unique identifier by the DS.

The unique identifier can take the form of a fixed or variable length number or name. Once the user of a network computer has been assigned a unique identifier by the Directory Service, the computer user can provide the unique identifier to PTT wireless phone or PTT network computer users who wish to establish push-to-talk sessions with the user's computer.

In one embodiment, the push-to-talk address takes the form of a SIP-URI that can be resolved using standard domain name system (DNS) protocols into the IP address and port number used for establishing a push-to-talk session with the destination network computer. Session Initiation Protocol (SIP) is a commonly used protocol on the Internet that defines a standardized mechanism for establishing a communications session between two endpoints. Utilizing this form of PTT address in the provisioning process of FIG. 3, a SIP Register message can be sent (as the "Provision" message of FIG. 3) that contains the unique identifier, the SIP-URI and the security credential. Upon receipt of the SIP Register message, the Directory Service stores the SIP-URI (as the push-to-talk address of the computer) along with the unique identifier associated with the computer.

In one embodiment, the Directory Service is a network application server that implements Domain Name System (DNS) protocols. The Domain Name System (DNS) is a name resolution standard commonly used on the Internet that defines a protocol for provisioning and querying a network application server to obtain address information associated with a domain name. Information is retrieved from the domain name system in the form of messages that contain defined resource records. In one embodiment, the push-to-talk address of a network computer and associated unique identifier are stored in the Directory Service in the form of a DNS Naming Authority Pointer (NAPTR) resource record and associated A (IP-address) record. In another embodiment, the push-to-talk address and associated unique identifier are stored in the Directory Service in the form of a DNS Service (SRV) record and associated A record. The Directory Service may contain multiple addresses for different Internet-enabled communications services associated with a given network computer, one of which is a push-to-talk address. In one embodiment, the NAPTR resource record or SRV record containing the push-to-talk address for a network computer is provisioned with a parameter that identifies the address as being a push-to-talk address, enabling the DS to resolve a request from a PTT service provider with the associated PTT address.

Figure 4:
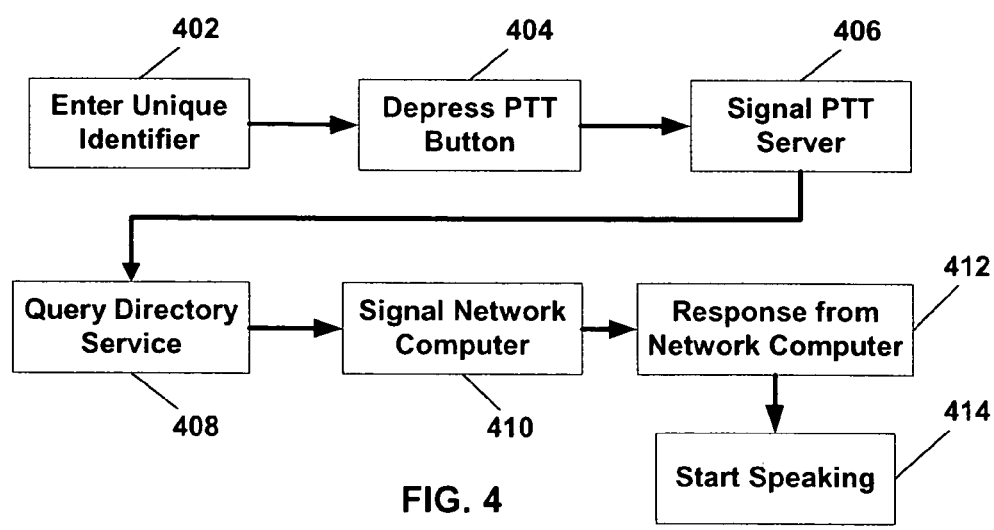
FIG. 4 is a flow chart of a method for operating the system of FIG. 2.

FIG. 4 is a flowchart of a method for operating the system of FIG. 2. A wireless phone user enters a destination address (i.e., unique identifier) (402) and depresses the push-to-talk button (404) to initiate a push-to-talk session with a network computer connected to the Internet that supports push-to-talk functionality. The wireless phone sends a signal to the PTT server (406) using standard VoIP protocols requesting a push-to-talk session with the computer identified by the destination addressed entered by the wireless phone user. According to one embodiment, the PTT Server can recognize that the destination address entered by the wireless user represents an address for an unregistered network computer, versus an address for a wireless phone registered with the local PTT server or a wireless phone registered with some other operator's PTT service. PTT industry standards support the use of either a mobile phone number (e.g., 1-978-555-1212) or a network access identifier (e.g., user@operator.com) as a valid destination address for identifying a registered mobile phone or computer with push-to-talk functionality. If the calling party wishes to initiate a push-to-talk session with an unregistered network computer, the calling party enters a destination address that the PTT Server can identify as belonging to an unregistered network computer. In one embodiment, an unregistered network computer is identified by a unique identifier issued by the Directory Service that takes the form of a number that starts with a # symbol (e.g., #123456789). The originating PTT server can thus easily distinguish between a request for a push-to-talk session with a registered mobile user identified by either a phone number (1-978-555-1212) or a network access identifier (i.e. user@operator.com), versus an unregistered network computer identified by a number that starts with a # (#123456789). In another embodiment, the unique identifier is a number that starts with a * rather than a #. The * and # characters are useful in this context because these characters can be entered on all standard telephone key pads and yet these characters are not utilized as part of standard telephone number addressing.

Upon recognizing the destination address as belonging to an unregistered network computer, the PTT server queries the Directory Service (408) with the unique identifier using standard VoIP protocols or standard directory/database query protocols to obtain a push-to-talk address for the destination computer. The PTT server then signals the destination computer (410) to initiate a push-to-talk session at the push-to-talk address obtained from the query to the Directory Service. The destination computer responds (412) with an indication that it is available and ready to engage in a push-to-talk session with the caller. The PTT server proxies this response back to the wireless phone that originated the push-to-talk session. The caller can then begin to speak (414).

Figures 5, 6, 7:
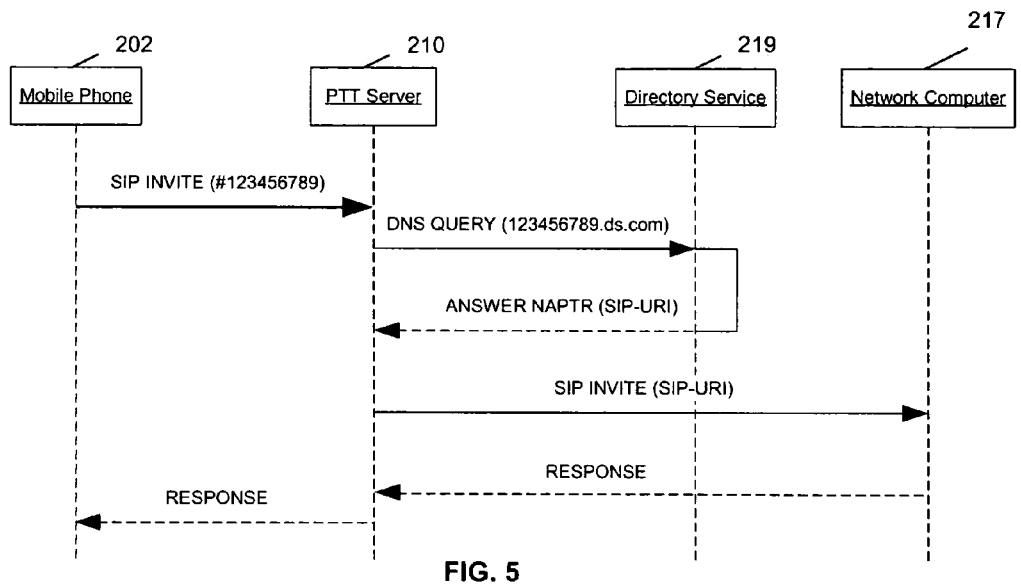
FIG. 5 is a sequence diagram of a method in which a PTT server uses a unique identifier to query a Domain Name System (DNS) Directory Service to discover a SIP push-to-talk address for a network computer.
FIG. 6 is an example of a push-to-talk address for a network computer provisioned in a domain name system (DNS) server in the form of a NAPTR record and associated A record.
FIG. 7 is an example of a push-to-talk address for a network computer provisioned in a domain name system (DNS) server in the form of an SRV record and associated A record.

FIG. 5 is a sequence diagram of a method of using standard VoIP protocols to discover a push-to-talk address for an unregistered network computer. In one embodiment, a wireless phone user (202) enters a unique identifier as a destination address in the form #123456789 to request a push-to-talk session with a network computer (217) connected to the Internet. The wireless phone (202) uses standard VoIP protocols to communicate with its PTT server (210) to request a push-to-talk session with the network computer identified by the unique identifier. In one embodiment, the wireless phone or mobile phone (202) sends a standard SIP INVITE message containing the unique identifier (#123456789) to its PTT Server (210), requesting a push-to-talk session with the destination network computer (217). The leading # sign in the unique identifier indicates to the PTT server that the destination is an unregistered network computer. In one embodiment, the PTT server (210) is programmed to query a DNS-based Directory Service (219), accessible on the Internet, upon receipt of a session request that contains a unique identifier starting with # (e.g., #123456789). In one embodiment, the PTT server formats the unique identifier into the form of a valid DNS domain name (123456789.ds.com) by removing the leading # sign and by appending the domain ("ds.com") of the destination Directory Service. In this example, the leading "#" character is removed from the unique-identifier because the "#" character is not a valid character in a DNS domain name. The PTT server (210) issues a standard DNS query for a defined resource record to the Directory Service (219) to request a push-to-talk address for the destination computer. In one embodiment, the Directory Service uses the Naming Authority Pointer (NAPTR) resource record format to store the push-to-talk address for the network computer. The Directory Service (219) responds to the query with an answer message containing a NAPTR resource record with the push-to-talk address for the destination computer (e.g., a SIP-URI). The PTT server (210) then issues a standard SIP INVITE to the push-to-talk address (SIP-URI) returned from the Directory Service. The destination computer (217) receives the SIP INVITE and returns a SIP RESPONSE to the PTT server (210). The PTT Server then signals the originating mobile phone user (202) and the standard SIP session initiation procedures follow.

FIG. 6 is an example of one set of DNS resource records that can be used to resolve an IP-address and port number for establishing a push-to-talk session with a network computer using a unique identifier (#123456789). In this example, the Directory Service is located at the domain "ds.com". The NAPTR record provides a mechanism for translating the unique identifier (#123456789) into a SIP address for the destination network computer in the form of a SIP-URI ("sip:123456789.ds.com:5065"). The SIP-URI contains the port number ("5065") used for establishing push-to-talk sessions with the destination network computer identified by the domain name ("123456789.ds.com"). An associated A-record provides the mechanism for resolving the IP-address ("208.254.45.97") of the computer represented by the domain name ("123456789.ds.com") using standard domain name system protocols.

FIG. 7 is an example of another set of DNS resource records that can be used to resolve an IP-address and port number for establishing a push-to-talk session with a network computer using a unique identifier (#123456789). Here an SRV record provides the mechanism for discovering the correct port number ("5065") for establishing push-to-talk sessions with the destination network computer identified by the domain name ("123456789.ds.com"). The associated A-record provides the mechanism for resolving the IP-address ("208.254.45.97") of the computer represented by the domain name "123456789.ds.com".

In one embodiment, each time a network computer is turned-on and its PTT application is started, the PTT application provides the Directory Service with its current IP address and port number for receiving PTT sessions. In the event that a network computer is moved to another network or in the event that the computer's IP-address and/or port is changed, the PTT application provides an updated push-to-talk address to the Directory Service.

Figure 8:
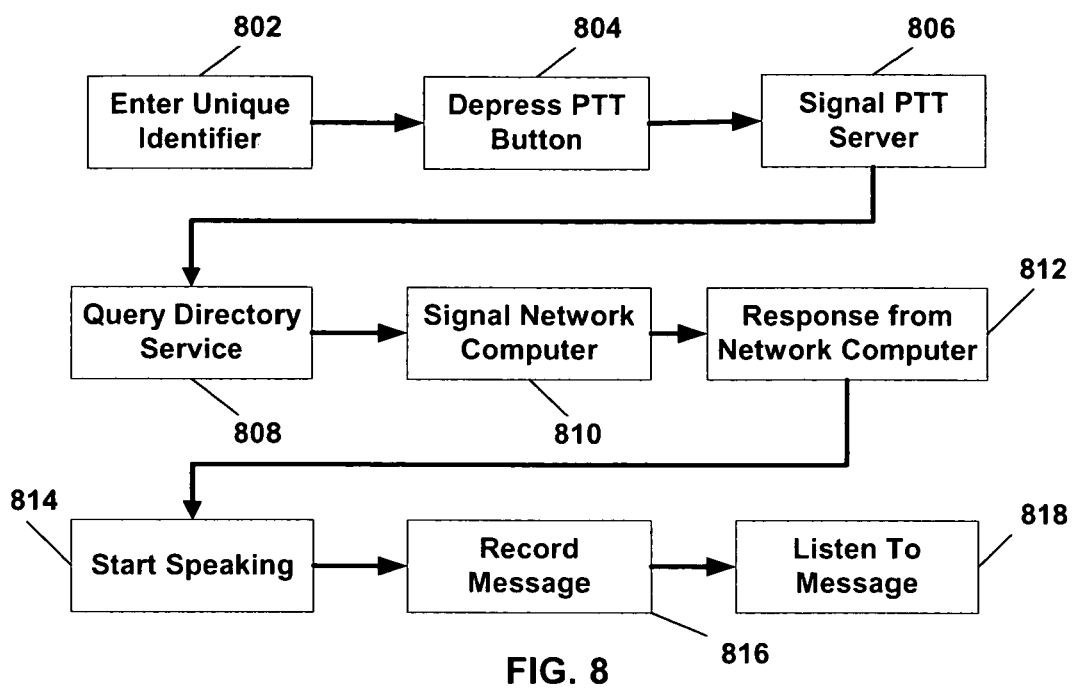
FIG. 8 is a flow chart of a method for leaving a voice message on a push-to-talk enabled network computer.

FIG. 8 is a flowchart of a method for operating the system of FIG. 2 as it relates to the ability of the system to support a push-to-talk voice messaging feature. A wireless phone user enters a unique identifier (802) and depresses the push-to-talk button (804). The wireless phone sends a signal to the PTT server (806) requesting a push-to-talk session with the destination computer identified by its unique identifier. The PTT server queries a Directory Service (808) using the unique identifier to obtain a push-to-talk address for the destination computer. The PTT Server signals the computer (810) to initiate a push-to-talk session at the address obtained from the query to the Directory Service. The destination computer responds (812) with an indication that the end-user of the computer is not available but the computer is ready to record a push-to-talk voice message. The caller starts speaking (814) and the destination computer records this as a push-to-talk voice message (816). The called party retrieves the voice message (818) at a later time.

Further details concerning push-to-talk communications systems can be found in U.S. Pat. No. 6,360,093 to Ross, entitled "Wireless Push-to-Talk Internet Broadcast," issued Mar. 19, 2002, and U.S. Pat. No. 6,295,284 to Maggenti, entitled "Method and Apparatus for Providing Fair Access in a Group Communication System," issued Sep. 25, 2001, each of which is hereby incorporated by reference in their entirety. An end user equipment in such systems is a hardware device (e.g., a wireless phone) with push-to-talk software used by the user. The wireless telephone may include: a speaker; a microphone; a micro-browser or a micro-client software having an Internet, intranet, or extranet address; a voice CODEC software to the micro-browser or micro-client software; and a real or virtual push-to-talk button. The telephone also includes means for sending an outgoing streaming voice data message (SVDM) from the microphone through the voice CODEC manager software. The telephone further includes means for indicating that the PTT button has been depressed, in response to a depression of the PTT button. It further includes means for sending an incoming streaming voice data message through the voice CODEC manager software to the speaker, in response to a release of the PTT button.

The PTT service provider system may include one or more servers for implementing the application level network functionality for the PTT service. This functionality includes session handling, such as SIP session origination and termination, policy enforcement for participation in group sessions, and list management operations to create, modify, retrieve and delete groups and contact lists. The PTT system may utilize an SIP/IP core which includes a number of SIP proxies and SIP registrars to provide various functions needed to support the PTT service, such as routing the SIP signaling between the PTT client and PTT server, providing discovery and resolution services, compression, authentication and authorization, maintaining the registration state and providing bill or charging information. The service provider system may further include an arbitration system to limit access to the dedicated channel, sometimes referred to as a broadcast channel, used to transmit communications from one member to other members of the group simultaneously. Typically, the arbitration system is located at a central facility or base station.

Further details concerning the Directory Service can be found in U.S. Pat. No. 6,539,077 to Ranalli, entitled "Method And Apparatus For Correlating A Unique Identifier, Such As A PSTN Telephone Number, To An Internet Address To Enable Communications Over The Internet" and hereby incorporated by reference in its entirety. The Directory Service may reside on a computer,. which may be a computer server, on a public computer network such as the Internet. The computer on which the Directory Service resides may contain a database of records and associated interface modules (e.g., HTTP, LDAP, and DNS modules) with programs for accessing the database and interfacing with various communication applications that utilize the Directory Service. The DS computer may include at least one interface for receiving electronic transmissions from multiple communications systems, such as one or more of an IP-PBX, IP-CO, IP-Centrex, IP-telephone, IP-wireless phone, IP-voice mail, IP-fax, unified messaging and remote printing systems. The computer may also include a website which provides information on the database for users. The computer may include a CPU and a memory operatively connected to the CPU. The memory may contain a program, adapted to be executed by the CPU, for resolving requests to resolve a unique identifier to a PTT address.

A network address as used herein designates a destination address on a data network. It may include an Internet protocol (IP) address, an SMPT email address, a VPIM address, or any one of a variety of address protocols used on the Internet. The Internet address may also include any additional information required by a communications system to establish communication links over the Internet.

The Session Initiation Protocol (SIP) is defined in RFC (2543) of the Internet Engineering Task Force (IETF). The Domain Name System (DNS) is defined in RFC (1034) and RFC (1035) of the Internet Engineering Task Force (IETF).

The previous description of select embodiments is provided to enable any person skilled in the art to make or use the present invention. Various modifications to these embodiments will be readily apparent to those skilled in the art, and thus the present invention is not intended to be limited to the embodiments shown herein.

The invention claimed is:

1. A method comprising:
extending a mobile operator's push-to-talk (PTT) system to enable registered users on the PTT system to establish PTT sessions with unregistered end-user equipment, where such unregistered end-user equipment is not registered for PTT service with any mobile operator's PTT system but can be located on a public data network by querying a directory service database accessible on a public data network, the database containing a PTT address for the unregistered end-user equipment, the method including:
a wireless phone, having PTT functionality and registered with the mobile operator's PTT system, sending a request for a PTT session to the system's PTT server, the request including a unique identifier of the unregistered end-user equipment wherein the equipment comprises a destination network computer accessible on a public data network and having PTT functionality;
the PTT server receiving the request and sending a query to the directory service database for the PTT address of the unregistered end-user equipment;
the directory service database receiving and resolving the query, based on the unique identifier, to the PTT address of the unregistered end-user equipment; and
the PTT server receiving the PTT address and sending a request to initiate a PTT session with the destination network computer.

2. The method of claim 1, wherein the public data network is the Internet.

3. The method of claim 1, wherein the PTT address is a Session Initiation Protocol (SIP) address.

4. The method of claim 3, wherein the SIP address is a SIP-URI that can be further resolved into an IP address and a port number for receiving PTT sessions at the destination network computer.

5. The method of claim 1, wherein the directory service issues the unique identifier to the destination network computer.

6. The method of claim 5, wherein the unique identifier is a telephone number with a # prefix.

7. The method of claim 1, wherein the unique identifier is a fixed or variable length number or name with a # or * prefix.

8. An apparatus comprising:
a push-to-talk (PTT) server of a mobile operator's PTT system including means for extending the PTT system to enable a registered user of the PTT system to initiate a PTT session with unregistered end-user equipment which is not registered for PTT service with any mobile operator's PTT system, the unregistered end-user equipment comprising a destination network computer having PTT functionality and being accessible on a public data network;
the PTT server containing means for querying an external directory service database, accessible on a public data network, with a unique identifier to obtain a PTT address for the unregistered end-user equipment, and
means for initiating a PTT session with the unregistered end-user equipment.

9. The apparatus of claim 8, wherein the means for querying includes means for querying a DNS directory service.

10. The apparatus of claim 8, wherein the means for querying includes means for receiving the PTT address.

11. The apparatus of claim 8, wherein the means for initiating includes means for sending a PTT session request to the destination network computer.

12. The apparatus of claim 11, including means for receiving a PTT session response from the destination network computer.

13. The apparatus of claim 11, including means for accessing a user equipment registered with the PTT server, means for receiving a request for a PTT session with the unique identifier, and means for sending the user equipment a session response.

14. An apparatus comprising:
a directory service,
residing on a computer,
accessible on a public data network, and
containing a unique identifier and an associated push-to-talk (PTT) address of an unregistered end-user equipment comprising a destination network computer having PTT functionality and accessible on a public data network and not registered for PTT service with any mobile operator's PTT system,
wherein the directory service extends a mobile operator's PTT system to enable a registered user of the PTT system to initiate a PTT session with the unregistered end-user equipment, the directory service comprising a database external to the PTT system and including:

means for receiving a request including a unique identifier from a PTT server of the PTT system, means for resolving the request to identify the unregistered end-user equipment associated with the unique identifier, and means for returning the PTT address to the PTT server.

15. The apparatus of claim 14, wherein the public data network is the Internet.

16. The apparatus of claim 14, wherein the destination address is a Session Initiation Protocol (SIP) address.

17. The apparatus of claim 16, wherein the SIP address is a SIP-URI that can be resolved into an IP address and a port number for receiving PTT sessions at the network computer.

18. The apparatus of claim 14, wherein the unique identifier is a number or name.

19. The apparatus of claim 14, wherein the directory service is a domain name system (DNS) directory service.

20. The apparatus of claim 14, wherein the directory service stores the PTT address as a resource record.

21. The apparatus of claim 20, wherein the format of the resource record is one or more of a Naming Authority Pointer (NAPTR), Service (SRV), and A record.

* * * * *